United States Patent
Nesteroff et al.

(10) Patent No.: US 12,445,819 B2
(45) Date of Patent: Oct. 14, 2025

(54) COMMUNICATION SERVICES ORDERING AND PROVISIONING

(71) Applicant: Juniper Networks, Inc., Sunnyvale, CA (US)

(72) Inventors: Lyubov Nesteroff, Pleasant Hill, CA (US); Yelena Kozlova, Sunnyvale, CA (US); Ojas Gupta, Mountain View, CA (US); Marc-Andre Bordeleau, Shawinigan (CA); Constantine Dimitrios Polychronopoulos, Saratoga, CA (US); Edward Wai Hong Choh, Richmond (CA); Georgios Oikonomou, Patra (GR); Jeremy Alan Tidemann, Savoy, IL (US); Arda Akman, San Ramon, CA (US); Robert Edward Kidd, Champaign, IL (US); Mingjie Zhao, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 531 days.

(21) Appl. No.: 17/646,625

(22) Filed: Dec. 30, 2021

(65) Prior Publication Data
US 2023/0209319 A1   Jun. 29, 2023

(30) Foreign Application Priority Data

Dec. 29, 2021  (EP) ..................................... 21386082

(51) Int. Cl.
*H04W 4/50* (2018.01)
*H04L 41/22* (2022.01)
(Continued)

(52) U.S. Cl.
CPC ............... *H04W 4/50* (2018.02); *H04L 41/22* (2013.01); *H04L 41/5048* (2013.01); *H04W 4/029* (2018.02)

(58) Field of Classification Search
CPC ........ H04W 4/50; H04W 4/029; H04L 41/22; H04L 41/5048; H04L 41/5054;
(Continued)

(56) References Cited

U.S. PATENT DOCUMENTS 7,146,568 B2 * 12/2006 Richardson ......... H04L 41/0893
                                                        715/734
9,363,146 B2    6/2016 Cossins et al.
(Continued)

OTHER PUBLICATIONS

Extended Search Report from counterpart European Application No. 21386082.8 dated Jun. 29, 2022, 11 pp.
(Continued)

*Primary Examiner* — Dady Chery
(74) *Attorney, Agent, or Firm* — Shumaker & Sieffert, P.A.

(57) ABSTRACT

An example network provisioning system includes a provisioning portal that is configured to: receive, from a client device, a selection of a service template specifying network service attributes for a communication service, receive a selection of one or more tracking areas, receive a selection of one or more subscribers, and generate a service order based on the network service attributes for the communication service, the one or more tracking areas, and the one or more subscriber. The network provisioning system is configured to provision the communication service in accordance with the service order.

18 Claims, 12 Drawing Sheets

(51) Int. Cl.
*H04L 41/5041* (2022.01)
*H04W 4/029* (2018.01)

(58) Field of Classification Search
CPC . H04L 41/12; H04L 41/5051; H04L 41/5019; H04L 41/5058
See application file for complete search history.

(56) References Cited

U.S. PATENT DOCUMENTS

| | | | |
|---|---|---|---|
| 11,869,158 B2 | 1/2024 | Caswell et al. | |
| 2002/0054169 A1* | 5/2002 | Richardson | H04L 41/0893 715/854 |
| 2005/0004944 A1 | 1/2005 | Cossins et al. | |
| 2011/0040896 A1 | 2/2011 | DeCusatis et al. | |
| 2011/0151864 A1 | 6/2011 | Byun et al. | |
| 2014/0006956 A1 | 1/2014 | Juliyar et al. | |
| 2016/0065417 A1* | 3/2016 | Sapuram | H04L 41/50 709/223 |
| 2017/0311115 A1* | 10/2017 | Adrangi | H04W 4/80 |
| 2019/0037518 A1 | 1/2019 | Russell | |
| 2019/0140933 A1* | 5/2019 | Guim Bernat | H04L 47/2425 |
| 2021/0226847 A1 | 7/2021 | Jindal et al. | |
| 2021/0306938 A1 | 9/2021 | Seetharaman et al. | |
| 2021/0320897 A1* | 10/2021 | Stojanovski | H04W 4/50 |
| 2021/0327009 A1 | 10/2021 | Williams et al. | |
| 2022/0021723 A1 | 1/2022 | Oyman et al. | |
| 2022/0043731 A1 | 2/2022 | Larson et al. | |
| 2022/0322058 A1 | 10/2022 | Etuke et al. | |
| 2023/0262828 A1 | 8/2023 | Neelakantamurthy et al. | |

OTHER PUBLICATIONS

China Mobile et al: "System architecture for the 5G System (5GS)" a 3GPP Draft; 3rd Generation Partnership Project 2021, Technical Specification Group Services and System Aspects; System architecture for the 5G System (5GS); Stage 2 (Release 17), TS 23.501 V17.0.0 (Mar. 2021), Accessed Dec. 16, 2021, 489 pp.

Hu et al., "Visualizing Network Communication in Geographic Environment," IEEE, 2013 International Conference on Virtual Reality and Visualization (ICVRV), Sep. 14-15, 2013, Xi'an, China, pp. 206-212, DOI: 10.1109/CVRV.2013.39.

U.S. Appl. No. 17/644,973, filed Dec. 17, 2021, naming inventors Nesteroff et al.

3GPP Draft, "Reporting the Number. of UEs in Certain Geographic Area", 3rd Generation Partnership Project (3GPP), Jan. 2015, 4 pp.

3GPP Standard, "3rd Generation Partnership Project; Technical Specification Group Services and System Aspects; Study of Enablers for Network Automation for 5G (Release 16)", Technical Report, Mar. 2019, pp. 1-124.

3GPP Standard, "3rd Generation Partnership Project; Technical Specification Group Services and System Aspects; Procedures for the 5G System ( 5GS) ; Stage 2 (Release 17)", Sep. 2021, pp. 1-713.

Response to Extended Search Report dated Jun. 29, 2022, from counterpart European Application No. 21386082.8 filed Jan. 5, 2024, 15 pp.

Communication pursuant to Article 94(3) EPC from counterpart European Application No. 21386082.8 dated Dec. 23, 2024, 9 pp.

* cited by examiner

Services / Templates ∨ / Communication Service ∨ / Service Order

Service Order ⓘ

General — Area of Service — Subscribers — Summary

ⓘ For now, Communication Service is enabled for all subscribers.

Subscribers

| | IMSI Number | Description | Wildcard |
|---|---|---|---|
| ☑ | 4600013579246780 | Description | RIC1: edge1 |
| ☑ | 5021301234567689 | Description | RIC2: edge2 |
| ☑ | 4600013579246780 | Description | RIC1: edge1 |
| ☐ | 3101708454660094 | Description | RIC2: edge2 |
| ☐ | 5021301234567689 | Description | RIC1: edge1 |
| ☐ | 4600013579246780 | Description | RIC2: edge2 |
| ☐ | 4600013579246780 | Description | RIC1: edge1 |
| ☐ | 4600013579246780 | Description | RIC1: edge1 |

523 Items

Services / Orders ∨
Orders ⓘ

ⓘ The service order (4600001357924680) is placed successfully.

Service order History

| | Order ID | Description | CST Name | CSI Name | Deployment Status |
|---|---|---|---|---|---|
| ☐ | 4600001357924680 | Description | xxx | Video Streaming | ⊘ Acknowledged |
| ☑ | 5021301234567890 | Description | xxx | Video Streaming | ① Failed |
| ☐ | 4600001357924680 | Description | xxx | Video Streaming | ⋯ In Progress |
| ☐ | 3101708454660094 | Description | xxx | Video Streaming | ⋯ In Progress1 |
| ☐ | 5021301234567890 | Description | xxx | Video Streaming | ⋯ In Progress1 |
| ☐ | 4600001357924680 | Description | xxx | Video Streaming | ⊘ Completed |
| ☐ | 4600001357924680 | Description | xxx | Video Streaming | ① Failed |
| ☐ | 4600001357924680 | Description | xxx | Video Streaming | ⋯ In Progress1 |
| ☐ | 4600001357924680 | Description | xxx | Video Streaming | ⋯ In Progress |

9 Items

COMMUNICATION SERVICES ORDERING AND PROVISIONING

RELATED APPLICATION

This application claims priority from European Patent Application No. 21386082.8, entitled "COMMUNICATION SERVICES ORDERING AND PROVISIONING" which was filed on Dec. 29, 2021, published as European Patent Application No. EP4207703A1 on Jul. 5, 2023, and is incorporated herein by reference in its entirety.

TECHNICAL FIELD

The disclosure relates to computer networking, and to ordering and provisioning communication services in a network.

BACKGROUND

Computer networks have become ubiquitous, and the number of network applications, network-connected devices, and types of network-connected devices are rapidly expanding. Such devices now include computers, smart phones, Internet-of-Things (IoT) devices, vehicles, medical devices factory equipment, etc. 5G network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for on-demand provisioning of services in a network, for example, a 5G network. Using the techniques disclosed herein, an end-user of a service can request that a network operator provision the service using a workflow that begins with selecting a service template that matches the service to be provisioned. A network service provider can provide a portal to a network provisioning system where the portal presents visual cues via a user interface that provides visualizations of the service provisioning process and receives user input that, in some cases, can be selected from the visualizations. In some aspects, the user can be a tenant (e.g., a customer) of a 5G mobile network operator. As an example, the tenant may be an enterprise customer of the mobile network operator. In some aspects, the user can be an administrator of a 5G network service provider.

Provisioning a service in a 5G network domain can involve multiple services and multiple service providers. For example, provisioning an end-to-end 5G network slice may involve provisioning network functions to support the network slice in multiple geographically-distributed data centers ("multi-cloud") and may further involve services provided and implemented in multiple network domains ("multi-domain") such as Radio Access Networks (RAN), transport networks, core network services, and service gateway interfaces (SGi). The different services and network domains may have different capabilities, functions, and service levels. A tenant may want to provision a complete communication service, and in some cases related network slices, to a network infrastructure owned or leased by the tenant. In existing systems, the tenant may contact the mobile network operator (MNO) to request that the service be provisioned. A network administrator may need to use a variety of different configuration interfaces and configuration parameters in order to provision the service. There can be significant wait times while the tenant waits for the mobile network operator to provision the service. This can be frustrating for the tenant, leading to a poor user experience. Further, the complexity and variety of interfaces and parameters can lead to significant errors during the provisioning process.

According to the techniques disclosed herein, a tenant (or network service provider for a provider-owned slice) can initiate, on-demand, provisioning of a communication service with a pre-defined service level agreement (SLA) and network slice templates (NSTs), and the tenant can specify different attributes of the service, e.g., tracking areas, compute clouds/data centers, allowed subscribers, network slice selection policies, etc. The communication service can be ordered by an end-user via a user interface that provides for profile selection and visual cues for selecting tracking areas, subscribers, data centers, etc. The techniques disclosed herein can facilitate a service order creation process that can be used by an end-user to request on-demand provisioning of an end-to-end network that can be created for specific SLA, use cases, and user requirements. In some aspects, the end-user can be a tenant of a mobile network operator that can provision communication services on an on-demand basis.

A network service provider such as a mobile network operator can utilize the techniques described herein to provide networking as a service (NaaS) to their customers. For example, the techniques can facilitate end-user and on-demand provisioning of private mobile networks. Examples of such private mobile networks include dedicated networks for connected vehicles, Internet-of-Things (IoT) networks, networks for industries etc. In some aspects, the network service provider may create, on demand, a network slice having QoS and other parameters based on a service order generated by a tenant or other end-user via an interface implementing techniques described herein.

The techniques disclosed herein include a provisioning portal that provides a user interface facilitating creation of service orders by tenants and other clients of a network operator. The user interface can lead a user through a series of operations of a workflow that can result in the creation of a service order that can instruct a provisioning system to configure and deploy a network service for the user. In some aspects, the communication service can be localized to a particular geographic area by providing an interface for a user to select components involved in providing the communication service from a map. The techniques disclosed herein can provide a technical advantage over previous systems by enabling end-users to perform on-demand provisioning of communication services. As a practical application of the techniques described in this disclosure, a provisioning portal can be used by an end-user tenant of a network operator to provision communication services of the network operator for use by the tenant. The provisioning portal can facilitate an end-user ordering a network service and have the network service provisioned on-demand without involving mobile network operator personnel. As a result, a tenant may be able to receive the benefits of the communication server sooner when compared with existing systems. Further, there may be less overhead for a mobile network operator. Moreover, the techniques allow a user to specify a localized geographic area for the service.

In one example, a system includes a network provisioning system comprising first processing circuitry; and a provisioning portal comprising second processing circuitry, wherein the provisioning portal is configured to: receive, from a client device, an indication of selection of a service template specifying network service attributes for a communication service, receive an indication of selection of one or more tracking areas, and generate a service order based on the network service attributes for the communication service and the one or more tracking areas, and wherein the network provisioning system is configured to provision, in network infrastructure, the communication service, in accordance with the service order, to provide the communication service at the one or more tracking areas.

In another example, a method includes receiving, by one or more processors from a client device, an indication of a selection of a service template specifying network service attributes for a communication service; receiving, by the one or more processors, an indication of a selection of one or more tracking areas; generating, by the one or more processors, a service order based on the network service attributes for the communication service and the one or more tracking areas; and provisioning, in network infrastructure, the communication service in accordance with the service order, to provide the communication service at the one or more tracking areas.

In another example, a system includes network provisioning system comprising first processing circuitry; and a provisioning portal comprising second processing circuitry, wherein the provisioning portal is configured to: output, for display on a display device of a client device, a tracking area map having a plurality of first graphical objects, each first graphical object representing a corresponding tracking area, output, for display on the display device, a compute cloud map having a plurality of second graphical objects, each second graphical object representing a corresponding compute cloud, receive an indication of a selection of one or more first graphical objects of the plurality of first graphical objects, receive an indication of a selection of one or more second graphical objects of the plurality of second graphical objects, generate a service order based on one or more tracking areas corresponding to the selected one or more first graphical objects and compute clouds corresponding to the selected one or more second graphical objects, and wherein the network provisioning system is configured to provision, in network infrastructure, the communication service, in accordance with the service order, to provide the communication service at the one or more tracking areas.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3G are conceptual views of user interface screens for provisioning a network service, according to techniques of the disclosure.

FIG. 4 is a conceptual view of a user interface screen showing service order status, according to techniques of the disclosure.

DETAILED DESCRIPTION

Figure 1:
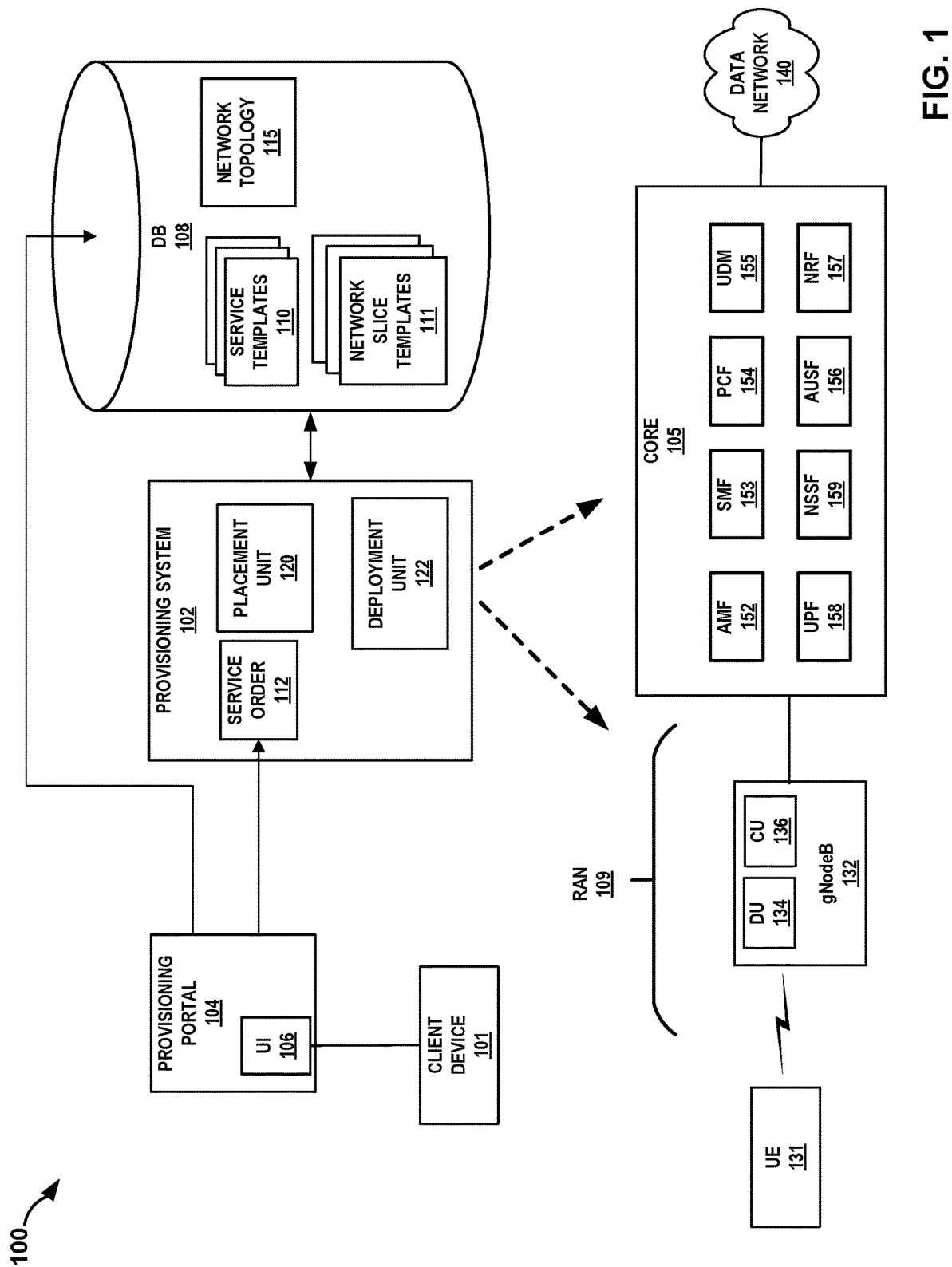
FIG. 1 is a block diagram illustrating an example network system, according to techniques of the disclosure.

FIG. 1 is a block diagram illustrating an example network system, according to techniques of the disclosure. In the example illustrated in FIG. 1, network system 100 includes provisioning system 102, provisioning portal 104, one or more radio access networks (RANs) 109, and core 105. Provisioning system 104 provisions communication services for customer of a network operator, for example, a mobile network operator. As an example, a tenant may order a communication service from a mobile network operator. The desired service may be described in service order 112. Provisioning system 102 processes the service order and may assign communications infrastructure and resources needed to provide the desired service to the tenant based on information in service order 112.

In some aspects, resources associated with the service to the tenant may be provided by, or managed by, functions of core 105 and/or components of RAN 109. In some aspects, core 105 implements various discrete control plane and user plane functions for network system 100. In some aspects, core 105 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 may provide access mobility management services. SMF 153 may provide session management services. PCF 154 may provide policy control services. Unified Data Management (UDM) function 155 may manage network user data. AUSF 156 may provide authentication services. Network Repository Function (NRF) 157 may provide a repository that can be used to register and discover services in a network operator's network. Network Slice Selection Function (NSSF) 159 may be used to select an instance of an available network slice for use by a user equipment (UE) device 131. Core 105 may also include User Plane Functions (UPF) 158. UPF 158 may provide packet routing, forwarding and other network data processing functions (e.g., Quality of Service, packet inspection, traffic optimization etc.). Further details on services and functions provided by AMF 152, SMF 153, PCF 154, UDM 155, NRF 157, AUSF 156 NRF 157, UPF 158 and NSSF 159 can be found in $3^{rd}$ Generation Partnership Project 2021, *Technical Specification Group Services and System Aspects; System architecture for the 5G System (5GS); Stage* 2 (*Release* 17), TS 23.501 V17.0.0 (2021-03), the entire contents of which is hereby incorporated by reference.

In some examples, RANs 109 include radio units (RUs) located at various cellular network sites ("cell sites"), along with distributed units (DUs) and centralized units (CUs). Each RU consists of an LO PHY and a RF transmitter. The LO PHY component may be implemented using specialized hardware for high-performance packet processing.

RUs can connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the Radio Link Control (RLC), Media Access Control (MAC), and the HI PHY layer. DUs are at least partially controlled by CUs.

DUs can connect to CUs via a midhaul network, which may be used by DUs and CUs to implement the F1 interface of 5G. CUs may implement the Radio Resource Control (RRC) and Packet Data Convergence Protocol (PDCP) layers. CUs connect to core 105 via a backhaul network. The midhaul and backhaul networks may each be wide area networks (WANs).

RANs 109 may include a gNodeB 102. In some examples of radio access networks 109 of network system 100, gNodeB 102 includes a CU 136 and a DU 134. CU 136 may support multiple DUs to implement multiple gNodeBs. Further, one or more RUs may be supported by a single DU 134.

Any DU may or may not be located at the cell site that includes the RU(s) supported by the DU. A DU may be located at a cell site, while other DUs may be located at a local data center and collectively support multiple RUs. Network system 100 may have radio access networks 109 that include many thousands of cell sites and gNodeBs.

Radio access networks 109 connect to core 105 to exchange packets with data network 140. Core 105 may be a 5G core network, and data network (DN) 140 may represent, for example, one or more service provider networks and services, the Internet, 3$^{rd}$ party services, one or more IP-VPNs, an IP-multimedia subsystem, a combination thereof, or other network or combination of networks.

Provisioning portal 104 provides an interface for use by client device 101 to provision communication services. In some aspects, provisional portal 104 can present a user interface 106 that presents user interface elements (e.g., screens, menus, maps, etc.) as part of a workflow for provisioning a communication service. In some aspects, the user interface and workflow can be an "end-to-end" workflow such that when the workflow is completed, there is enough information available to provisioning portal to create service order 112 that can be used by provisioning system 102 for provisioning a desired communication service.

Client device 101 can be an end-user computing device that receives user interface 106 elements for presentation, via a display coupled to client device 101, to a user operating client device 101. In some aspects, client device 101 may be operated by a tenant of a mobile network operator and used to order a desired communication service. In some aspects, client device 101 may be operated by mobile network operator personnel and used to provision communication services for tenants or for the use of the mobile network operator. For example, a mobile network operator may use the provisioning portal to provision slices to carry voice traffic, web browsing traffic, or other types of traffic.

Provisioning portal 104 can be communicatively coupled to client device 101 and provisioning system 102. In the example illustrated in FIG. 1, provisioning portal 104 is executed in a computing environment, which may be provided by a cloud service provider or at a branch office of the MNO. However, provisioning portal 104 may be executed in other environments. Provisioning portal 104 may be a component of provisioning system 102. Further, provisioning portal 104 may be a component of a server or other computing device in a data center, such as a data center of a mobile network operator. In addition, some operations attributed herein to provisioning system 102 or provisioning portal 104 may in various example be performed by either provisioning system 102 or provisioning portal 104.

In some aspects, communication services that may be provisioned using provisioning portal 104 include network slices. In 5G network environments, network slicing is a network architecture that facilitates creations of multiple virtualized and independent logical networks that are multiplexed over the same physical network infrastructure. A network slice can be logically isolated from other network slices and can be customized to meet service level expectations of an application that may be established by a service level agreement (SLA). In the example illustrated in FIG. 1, provisioning system 102 can create and allocate network slices on the mobile network operator's access network to data network 140.

In some aspects, mobile network operator may create network slice templates 111. A network slice template 111 can be a blueprint that defines various network slice attributes used to configure a network slice. For example, a network slice template can define networks and services used by a slice and interfaces to such networks and services. The template may be used to create a slice that may be tailored for a particular purpose. For example, network slice templates 111 may include a template for creating a network slice to carry video streams, a template for creating a network slice to carry cloud gaming network traffic, a template for creating a network slice to carry artificial reality traffic, etc.

Figure 2:
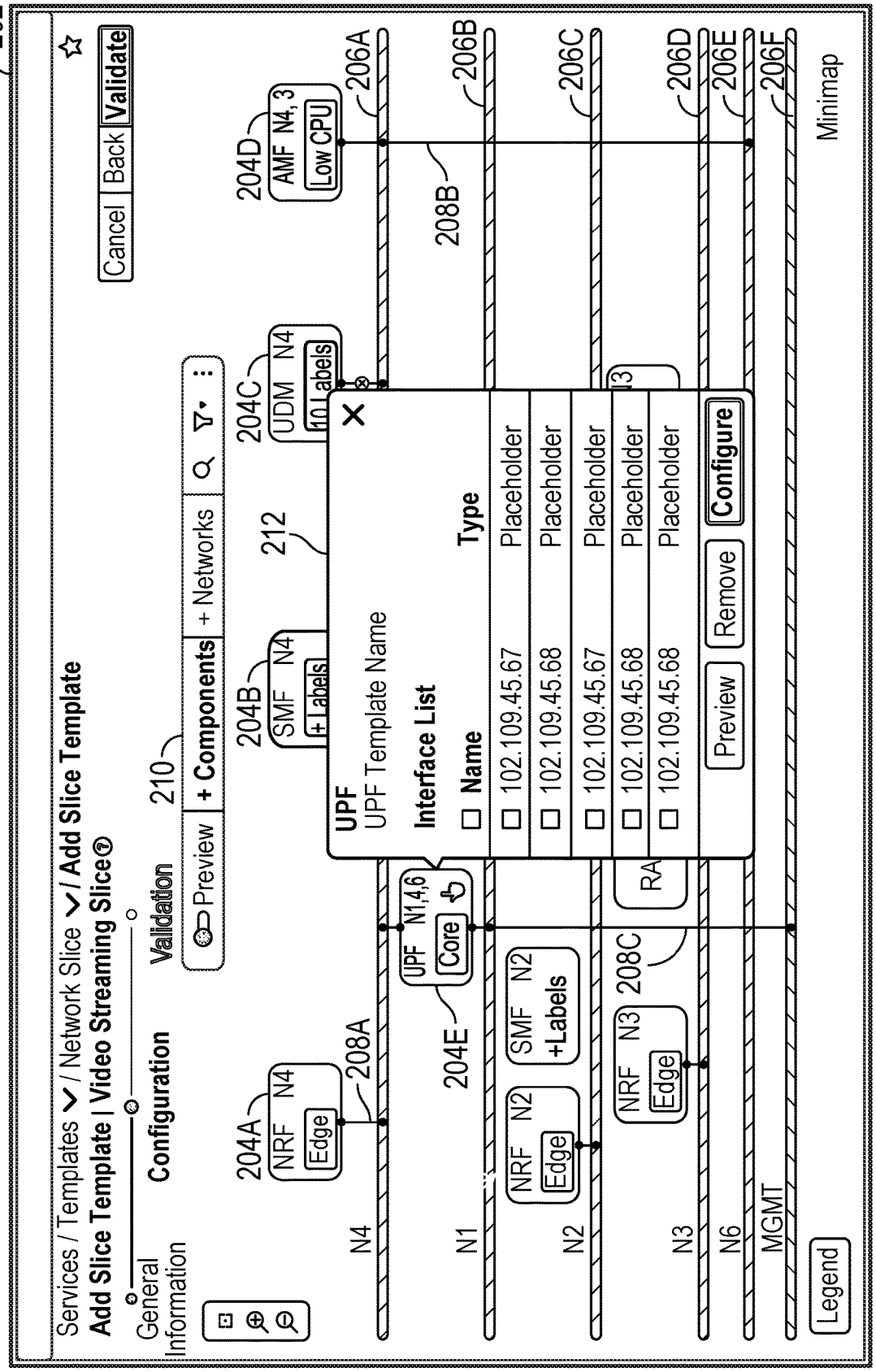
FIG. 2 is a conceptual view of a user interface screen for adding a network slice template, according to techniques of the disclosure.

FIG. 2 is a conceptual view of a user interface screen for adding a network slice template, according to techniques of the disclosure. FIG. 2 will be discussed in conjunction with aspects of FIG. 1. Slice template screen 202 may be used, for example, by a mobile network operator to define network slice templates for use by tenants in ordering and provisioning communication services. In some aspects, slice template screen 202 may be provided by user interface 106 of provisioning portal 104. In the example illustrated in FIG. 2, interface screen 202 includes graphical elements representing components used to implement a network slice, including network functions 204A-204E, interfaces 206A-206F, and connections 208A-208C. In some aspects, a function 204 may be any of functions 152-159 of core 105. Slice template screen 202 can provide a user interface to incorporate network functions 204A-204E and network interfaces 206A-206F into a network slice template. Slice template screen 202 can also be used to create and display connections 208 between interfaces 204 and functions 206. Provisioning portal 104 may obtain available functions, interfaces, and other network infrastructure elements to use when defining a network slice template from network topology 115 of database 108.

A user may utilize slice template screen 202 to add slice components such as functions 204 and interfaces 206 using control 210 to a network slice definition. After functions 204 and interfaces 206 are added to a network slice template, the user may utilize the interface provided in screen 202 to connect functions to interfaces. In the example illustrated in FIG. 2, NRF function 204A has been connected to N4 interface 206A, AMF function 204D has been connected to N4 interface 206A and N3 interface 206D, UPF interface 204E has been connected to N4 interface 206A, N1 interface 206B, and N6 interface 206E. Interface 206F can be a virtual network that connects multiple network functions. In the example shown in FIG. 2, management interface 206F can be a virtual network with management capabilities that connects multiple network functions. The network slice template, once created, can be used as a blueprint to create video streaming slices.

In some aspects, a function 204 may be assigned one or more labels using slice template screen 202. In the example, illustrated in FIG. 2, NRF function 204A has been assigned a label "Edge," AMF function 204D has been assigned a label "Low CPU," and UPF function 204E has been assigned the label "Core." Other functions 204 shown in FIG. 2 have also been assigned labels. During deployment of a slice created using the template, provisioning system 102 may use a label for a function 204 to match functions used by the provisioned slice to network infrastructure such as compute clouds or compute nodes. For example, a function having an "Edge" label may indicate that it is desirable (or even mandatory) that provisioning system 102 assign the function to resources in an edge compute cloud. For instance, it may be desirable that NRF function 204A be available with low latency, thus making it more desirable for provisioning system 102 to locate NRF function 204A at an edge of the network slice infrastructure. In this case, NRF function 204A has been assigned an "Edge" label. As a further example, a "Core" label may indicate that it is desirable that the network function be assigned to resources closer to the core of the 5G network slice. For example, User Plane Function (UPF) 204 carries data between a data network and user equipment and it may be desirable to locate UPF 204 closes to the data network (e.g., closer to the core). Other location-related labels may include "regional" or "national". A "low CPU" label may indicate that the function does not require high performance processing capability and can thus be assigned to resources that utilize lower performance processors. A "SmartNIC" label may indicate the function should be deployed to a compute node having a SmartNIC. Other labels may indicate the type of orchestration system for deployed the labeled function, such as "OpenShift", "OpenStack", or "Kubernetes". If a data center or cloud is not capable of supporting a capability associated with a label, the data center or cloud is not able to host the labeled function and may not be selectable in the portal user interface 106 by the user.

In some aspects, a user may utilize slice template screen 202 to obtain further information from components displayed on screen 202. In the example shown in FIG. 2, a user has selected UPF function 204E and, in response, provisioning portal 104 displays, on screen 202, information box 212 about UPF function 204E, including information related to the in interfaces of UPF function 204E. Information box 212 can include control elements (e.g., buttons, menus etc.) to configure the selected element (UPF function 204E in this example), remove the selected element, or preview the selected element. In some aspects, in response to selection of the preview control element, provisioning portal 104 displays the constituent network functions, configuration, and interfaces of the selected element. If the element currently has no constituent elements, the preview control element may be disabled.

After a user has defined a network slice template, for example, using screen 202, the user may assign a name to the network slice template and save the network slice template in database 108 as one of network slice templates 111 for later use in the on-demand provisioning of service facilitated by network system 100.

Returning to FIG. 1, database 108 may also include service templates 110. A mobile network operator may define (perhaps using user interface 106) service templates 110. Service templates 110 can include various templates that have predefined network service attributes that may be appropriate for various types of communication services. For example, service templates 110 may include templates that have predefined attributes that may be appropriate for network slices that are intended to carry enhanced mobile broadband (eMBB) network traffic, massive machine-type communications (mMTC) traffic, ultra-reliable and low-latency communications (URLLC) network traffic, video stream network traffic, augmented reality/virtual reality network traffic, cloud gaming network traffic, etc. Network service attributes can include labels identifying characteristics of components of a network service, core functions or other functions used to provide the communication service, interfaces used by the communication service, SLAs, throughput rates, latency characteristics, uplink and downlink limits, maximum number of user equipment (UE) devices allowed for the service, priority of the service, maximum sessions supported by the service, etc. A service template can serve as a blueprint for on-demand provisioning of communication services. For example, a tenant of a mobile network operator may select a service template as described below to perform on-demand ordering and provisioning of a communication service having attributes defined by the selected template.

FIGS. 3A-3G are conceptual views of user interface screens for on-demand ordering and provisioning a communication service, according to techniques of the disclosure. The user interface screens of FIGS. 3A-3G will be discussed in conjunction with aspects of FIG. 1. Generally speaking, the user interface screens of FIGS. 3A-3G are part of a workflow that a tenant of a mobile network operator (or the mobile network operator itself) may perform to request on-demand provisioning of a communication service. The user interface screens illustrated in the examples of FIGS. 3A-3G may be provided to client device 101 by user interface 106 for presentation on a display of client device 101.

Figure 3A:
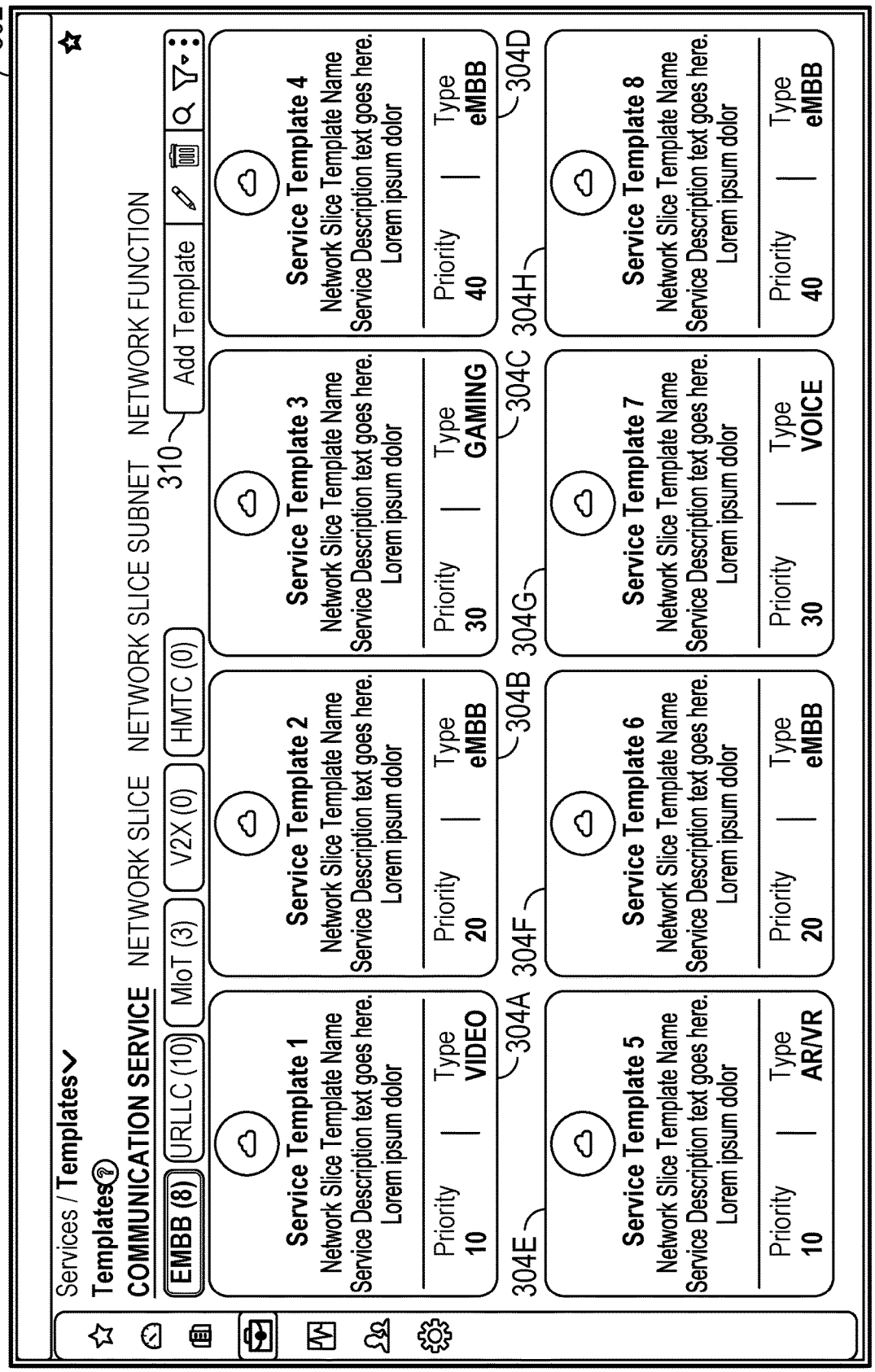

FIG. 3A is a conceptual view illustrating a service template selection screen 302, according to techniques of the disclosure. In some aspects, service template selection screen includes template icons 304A-304H (collectively "template icons 304") that each represent a different service template defined in service templates 110. In some aspects, a template icon can include the name of the template, a description of the template, a network slice template specified by the service template, a priority for network traffic for the provisioned service, and a type of service. A user desiring to provision a new communication service may utilize user interface 106 to select one of template icons 304 that most closely represents the type of communication service the user desires to provision.

Service template selection screen 302 include a control interface element 310 that include user interface elements that, when selected, cause the provisioning portal 104 to perform an action. For example, control interface element 310 includes an "add template" component that, when selected, causes provisioning portal 104 to present a user interface to configure a new service template. Other components of control interface element 310 can cause provisioning portal 104 to apply filters to service templates 304 and/or search for specific service templates 304.

Figure 3B:
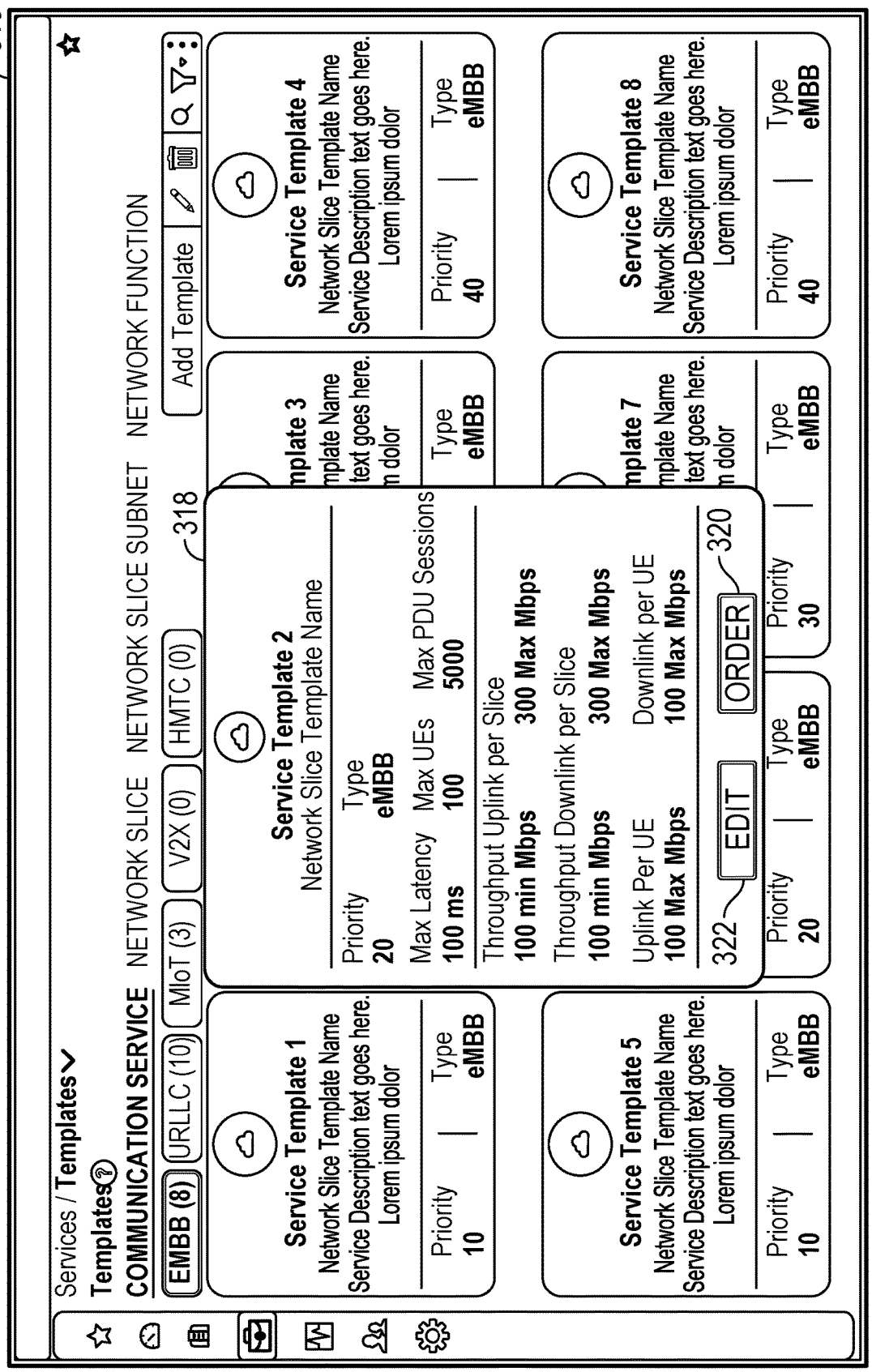

FIG. 3B is a conceptual view illustrating a service template definition screen 318, according to techniques of the disclosure. In the example illustrated in FIG. 3B, service template definition screen 318 is shown in response to selection of template icon 304B of FIG. 3A. Service template definition screen 318 displays attributes of the selected service template. Examples of such attributes include the priority of network traffic carried by a network slice created using the template (e.g., "20"), a type of network traffic carried by the network slice (e.g., "eMBB"). The attributes may also include service level attributes. For example, in the example illustrated in FIG. 3B, the template specifies a maximum latency (e.g., "100 ms), the maximum number of UEs for the communication service (e.g., "100"), and the maximum number of protocol data unit (PDU) sessions for the communication service (e.g., "5000"). Other SLA attributes that may specified include minimum and maximum uplink throughput for the network slice (e.g., "100 Mbps" and "300 Mbps" respectively), a minimum and maximum downlink throughput for the network slice (e.g., "100 Mbps" and "300 Mbps" respectively), and maximum uplink and downlink throughput per UE device (e.g., "100 Mbps" and "100 Mbps" respectively).

Service template definition screen may include an edit user interface element 322 and an order user interface element 320. In response to selection of edit user interface element 322, UI 106 of provisioning portal 104 can present an interface that can be utilized by a user to change various attributes from the default values provided by the selected service template. In response to selection of order user interface element 320, UI 106 of provisioning portal can present further user interface screens that to continue with a service order workflow. In some aspects, provisioning portal 104 may provide an estimated cost to the tenant for a service that is provisioned according to the selected template. For example, a communication service provisioned using a service template that specifies attribute values for a high throughput and/or low latency communication service may be priced higher than a communication service provisioned using a service template that does not specify attribute values for a high throughput and/or low latency communication service.

Figure 3C:
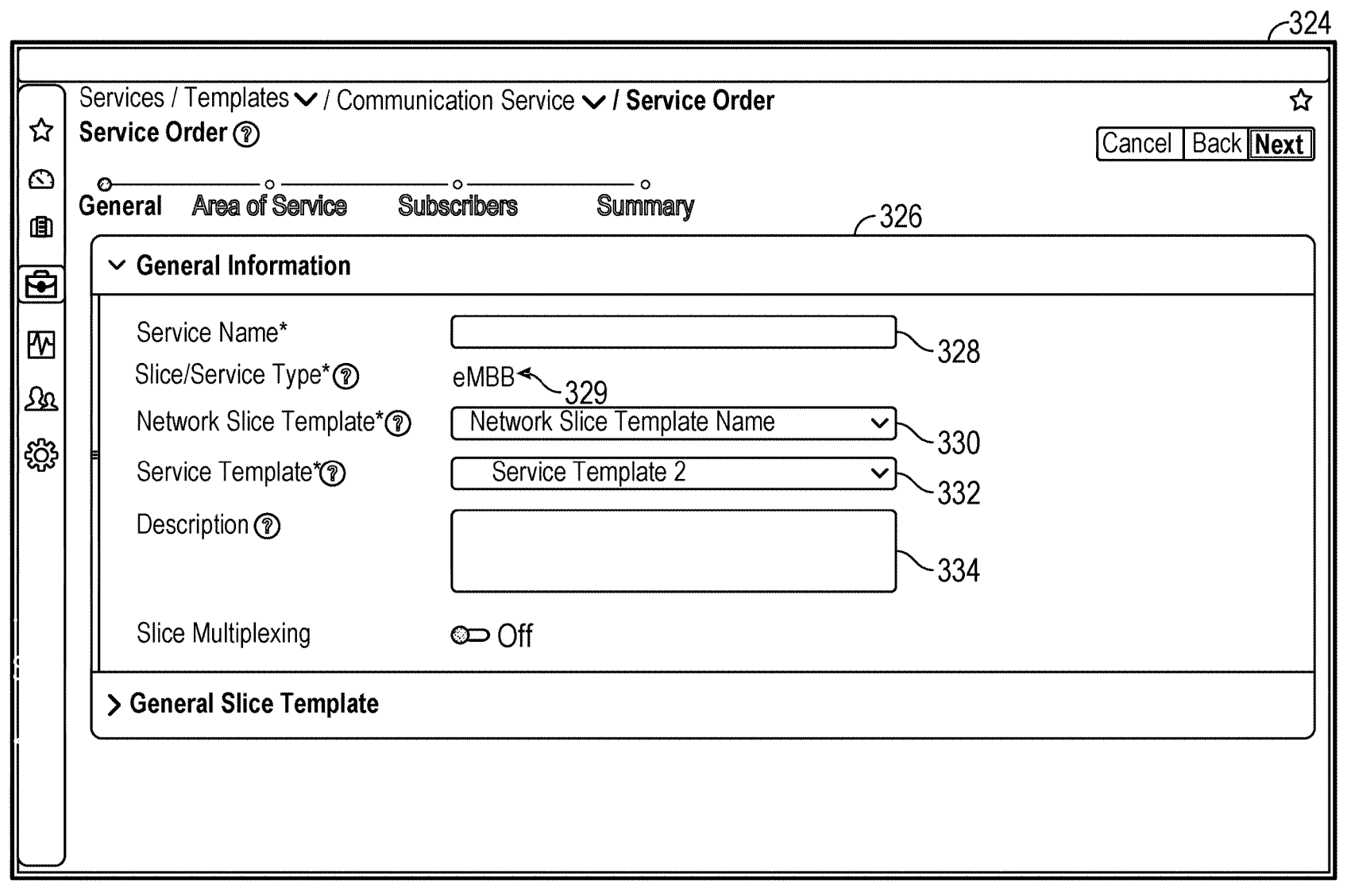

FIG. 3C is a conceptual view illustrating a general information portion 326 for a service order definition screen 324, according to techniques of the disclosure. UI 106 of provisioning portal 104 may present service order definition screen 324 to client device 101 in response to a user of client device 101 selecting the "order" user interface element 320 (FIG. 3B). General information portion 326 includes fields allowing a user to provide a communication service name 328 and a description 334 of the communication service to be provisioned. Additionally, general information portion 326 includes fields that can be used to modify attributes of the communication service from the defaults provided by the service template. For example, general information portion 326 may include service type field 329 that can be utilized to change the service type of the communication service to be provisioned from the default provided by the selected template. Similarly, network slice template field 330 can be used to change the network slice template from the default provided in the service template. Service template field 332 can be used to change the service template for the communication service to be provisioned to a different service template.

Figure 3D:
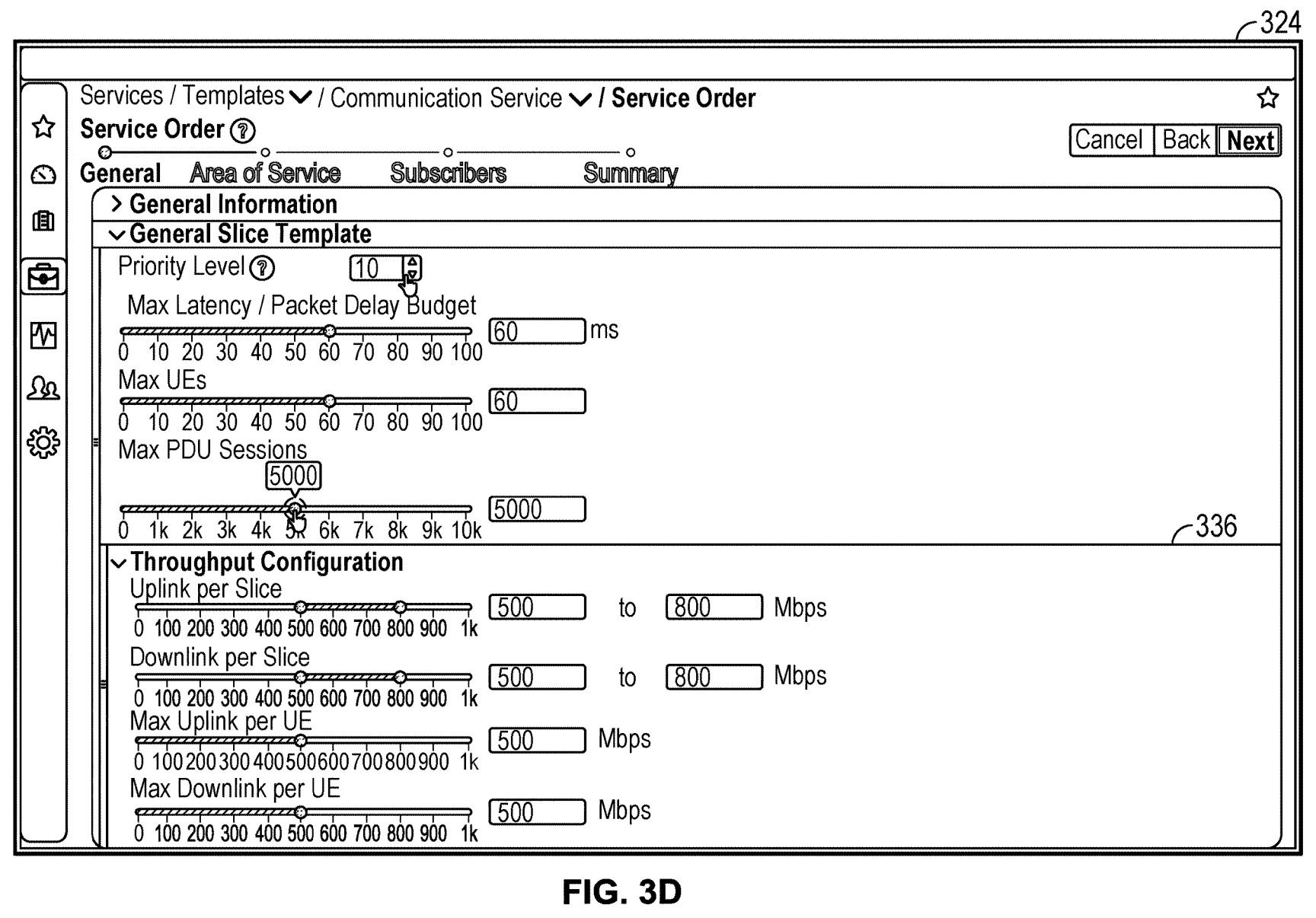

FIG. 3D is a conceptual view illustrating a general slice information portion 336 for a service order definition screen 324, according to techniques of the disclosure. General slice information portion 336 includes fields allowing a user to modify SLA related attributes for the network slice to be provisioned for the communication service. For example, general slice information portion 326 may include user interface elements allowing a user to modify SLA related attributes from the defaults provided by the network slice template associated with the service template. In the example illustrated in FIG. 3D, such attributes include priority, maximum latency, maximum UEs, maximum PDU sessions, minimum and maximum uplink throughput, minimum and maximum downlink throughput, maximum uplink throughput per UE, and maximum downlink throughput per UE.

Figure 3E:
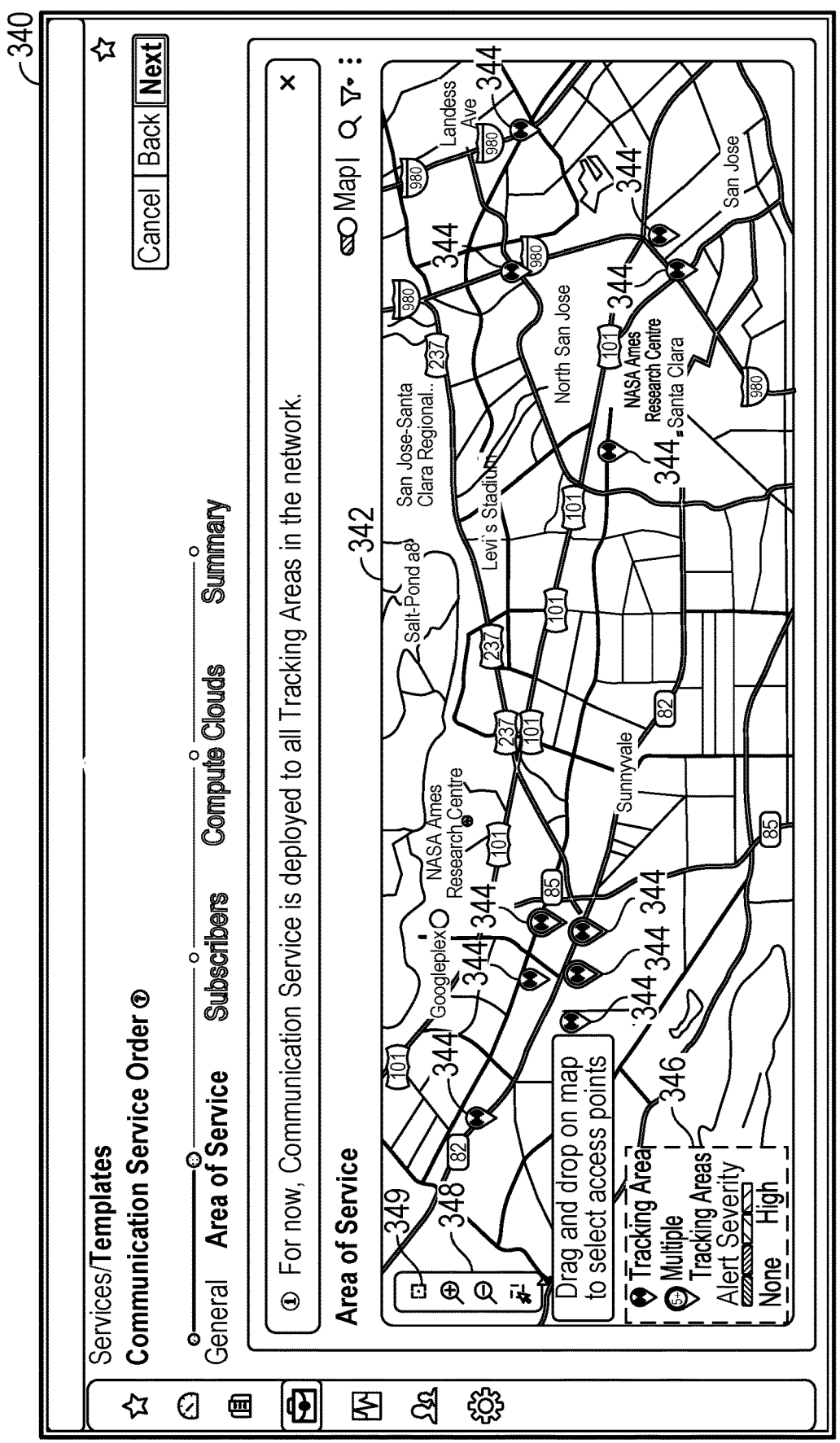

FIG. 3E is a conceptual view illustrating a tracking area selection screen 340 for a service order, according to techniques of the disclosure. Generally speaking, a tracking area is a set of one or more mobile network cells within region that are grouped together to facilitate reducing overhead involved with managing UEs. For example, handshaking protocols can be avoided when A UE moves from one cell in a tracking area to another cell in the same tracking area. A network slice can be associated with multiple tracking areas. Tracking area selection screen 340 of UI 106 provides selection mechanism for associated tracking areas with the network slice to be provisioned as part of a communication service. For example, a tenant may want to localize where a communication service is provided to their subscribers and can do so by selecting the desired tracking areas from selection screen 340. In the example illustrated in FIG. 3E, tracking area selection screen 340 shows a map 342 illustrating tracking areas 344 within a region. A user can utilize tracking area selection screen 340 to select one or more of tracking areas 344 to include in a network slice to be provisioned for the communication service.

Tracking area selection screen 340 includes a legend 346 that explains aspects of the tracking areas 344 shown on tracking area selection screen 340. As an example, legend 346 shows a color coded bar that can indicate an alert condition and severity associated with a tracking area. Tracking area selection screen 340 also includes control menu 348 having interface elements that can be used to select tracking areas 344 within a region, zoom in or zoom out on the map, etc. In some aspects, a user can utilize region selection tool 349 to select tracking areas of the mobile network operator that are within the region bounded by a rectangle formed using region selection tool 349. As an example, a tenant may desire to provide a specialized communication service in or near a stadium. The tenant can use region selection tool 349 to define the desired region around the stadium on map 342.

FIG. 3F is a conceptual view illustrating a subscriber screen 350 for a service order, according to techniques of the disclosure. Subscriber screen 350 of UI 106 can present a list 352 of subscribers associated with a tenant that is provisioning a communication service. The tenant can select the subscribers from the list that are to be given access to the communication service being provisioned by the tenant. In the example illustrated in FIG. 3F, a set of subscribers 354 has been selected to be granted access to the communication service once provisioned.

Figure 3G:
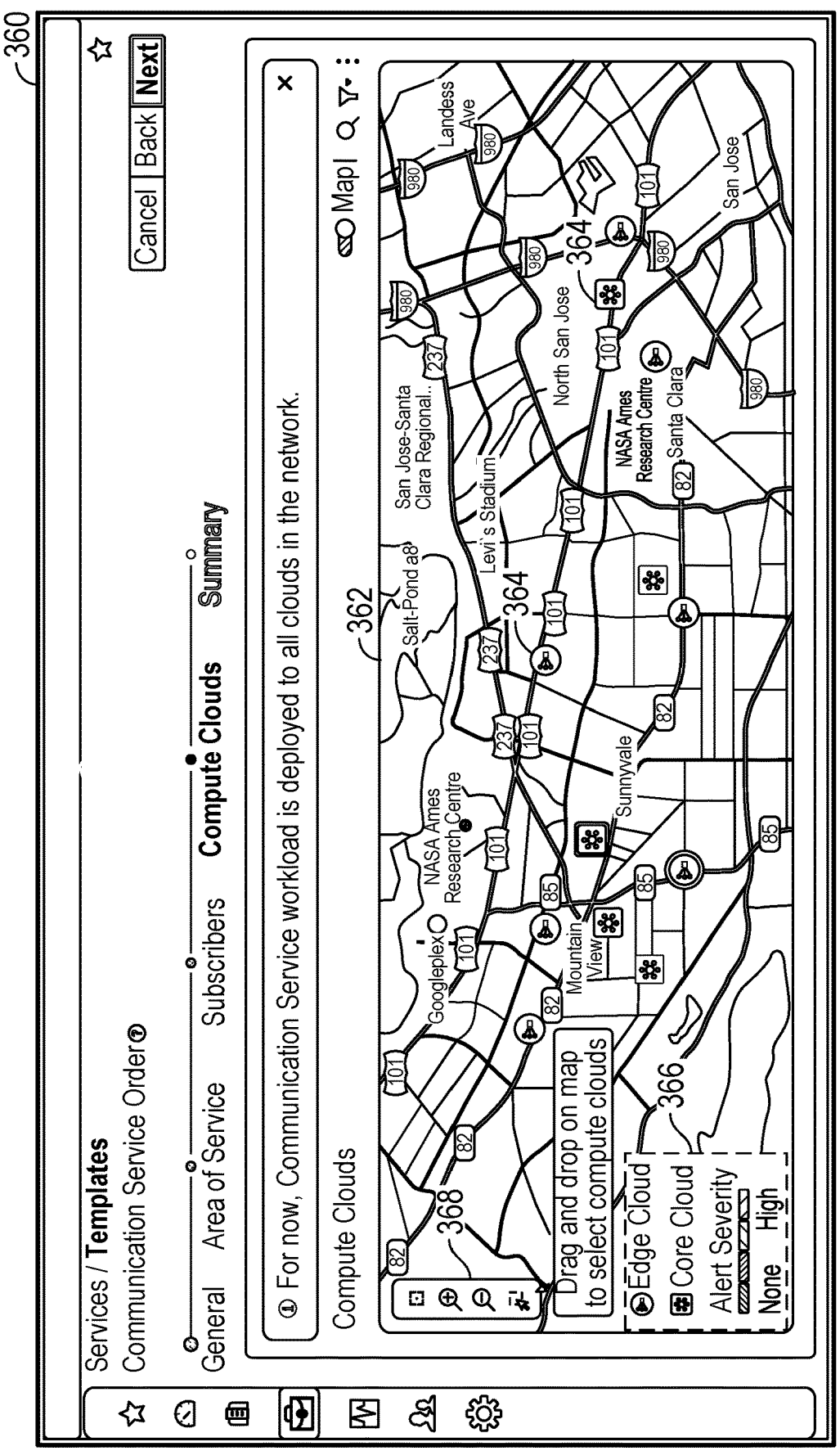

FIG. 3G is a conceptual view illustrating a compute cloud selection screen 360 for a service order, according to techniques of the disclosure. In the example illustrated in FIG. 3G, compute cloud selection screen 360 shows a map 362 illustrating icons 364 that represent compute clouds and/or data centers within a region. In some aspects, the compute clouds and/or data centers displayed on map 362 may be limited to compute clouds and/or data centers that are within the tracking areas previously selected via tracking area selection screen 340 of FIG. 3E. A user can utilize compute cloud selection screen 360 to select one or more of icons 364 representing the compute clouds and/or data centers that are to provide compute resources to execute workloads involved in providing the communication service to be provisioned. For example, workloads may include Radio Access Network (RAN) functions, core 105 functions, etc. A user can select a compute cloud based on desired characteristics of the communication service. For example, the user may select an icon 364 representing an edge cloud if low latency to the end user is desired. Further, a user may select an icon representing a core cloud to cause centralized units (CUs) to positioned near a core cloud, and may select icons representing an edge cloud to cause distributed units (DUs) to be located at an edge cloud. In some aspects, a compute cloud may have a label that indicates characteristics of the compute cloud. For example, the compute cloud may have label indicating the compute cloud is an edge compute cloud, a core compute cloud. Further, labels may indicate the processing power of the compute cloud. Other label may indicate other characteristics of a compute cloud. A mobile network operator can assign such labels to compute clouds.

Compute cloud selection screen 360 can include a legend 366 that provides information about the elements on map 362. As an example, legend 346 shows a color coded bar that can indicate an alert condition and severity associated with compute clouds shown on map 362. Compute cloud selection screen 360 also includes control menu 368 that provides user interface elements that can be used to select icons 364 within a region, zoom in or zoom out on the map, etc.

Returning to FIG. 1, in some aspects, the screens shown in FIGS. 3A-3G can be used to complete a workflow that gathers information from a user regarding a communication service to be provisioned on-demand by the mobile network operator. The information can be used to create service order 112 that can be processed by provisioning system 102 to provision the desired communication service.

Placement unit 120 can provide the information in service order 112 as input to a placement algorithm (also referred to as a homing algorithm) executed by placement unit 120 that can determine placement communication service elements (e.g., CUs and DUs) within the tracking areas and compute clouds selected by the user as described above. In some aspects, placement unit 120 places communication service elements based on labels associated with network slice elements. As an example, the placement algorithm can match attributes of the communication service specified in the service order with labels associated with infrastructure elements in the network slice template and labels of compute clouds. For instance, placement unit 120 may attempt to place a DU for a communication service whose attributed indicates low latency is required in a DU that is at an edge cloud selected by the user. Placement unit 120 may use other characteristics and attributes to determine placement of the network resources used by the communication service. For example, placement unit 120 can use labels associated with each compute cloud that may define the scope of the service (e.g., edge, regional, national). Additionally, placement unit 120 may utilize labels that specify a container runtime (e.g., Kubernetes, Openstack, etc.) to constrain placement of workloads to resources that support the specified container runtime. Further, placement unit may utilize labels that indicate that a network resource includes a smart NIC when workloads in the communication service to be deployed have characteristics indicating that a smart NIC is required (or desirable). Moreover, placement unit 120 can take affinity constraints into account. For example, placement unit may attempt to place a CU in the same cloud (or cloud provider) as a DU.

In some aspects, compute cloud selection screen 360 of FIG. 3G may be an optional part of a workflow. In such aspects, the placement algorithm of placement unit 120 can automatically include compute clouds and data centers that are within the tracking areas selected via tracking area selection screen 340 of FIG. 3E. In some aspects, a user can optionally use compute cloud selection screen 360 to provide a finer grained selection of compute clouds and/or data centers.

In some aspects, placement unit 120 can generate an estimate of costs to the user associated with the communication service to be provisioned. The estimate can be provided the user, and the user can utilize the estimate to determine whether or not to have the communication service deployed by deployment unit 122.

In some aspects, placement unit 120 can determine if there is a feasible placement for the communication service elements that are needed to provision the communication service. If there is such a feasible placement, the placement details can be provided as input to deployment unit 122, which can perform the provisioning of the communication service based on service order 112 and the placement determined by placement unit 120. If there is not a feasible placement for the communication service using the parameter and information gathered by the workflow represented by FIGS. 3A-3G, provisioning portal 104 can inform the user that the communication service cannot be deployed as specified. The user can then return to the screens of FIGS. 3A-3G to modify the parameters so that the feasibility of the communication service with respect to placement of network resources can be redetermined by placement unit 120.

In the example workflow screens shown in FIG. 3E and FIG. 3G, a map view of tracking areas and compute clouds is provided to the user. Additionally, or as an alternative, a list view of tracking areas and compute clouds may be provided.

FIG. 4 is a conceptual view of a user interface screen showing a service order history, according to techniques of the disclosure. In the example illustrated in FIG. 4, service order history screen 402 includes a list 404 of service orders that have been received for processing by deployment unit 122 (FIG. 1). The history of service orders can indicate that the service order has been received but not yet processed, is currently being processed, has completed processing, or failed to be processed.

Figure 5:
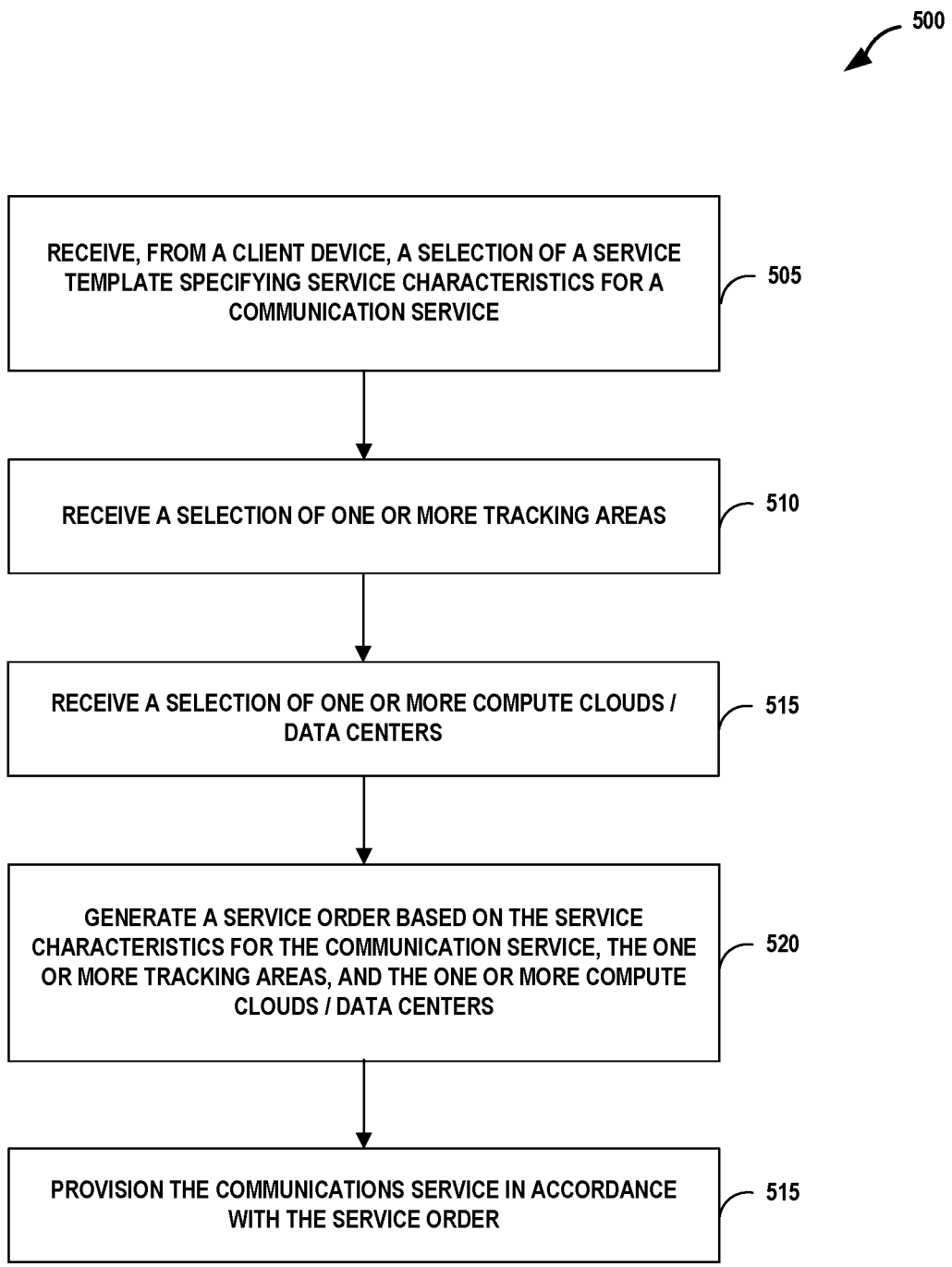
FIG. 5 is a flow chart illustrating operations of a method for provisioning network services, according to techniques of the disclosure.

FIG. 5 is a flow diagram illustrating example operations of a provisioning portal, in accordance with one or more techniques of this disclosure. A provisioning portal may receive, from a client device, a selection of a service template specifying network service attributes for a communication service (505). Next, the provisioning portal may receive a selection of one or more tracking areas (510). Next, the provisioning portal may receive a selection of one or more compute clouds and/or data centers (515). Next, the provisioning portal may generate a service order based on the network service attributes for the communication service, the one or more tracking areas, and the one or more compute clouds (520). Next, a provisioning system may provision the communication service in accordance with the service order (525).

Figure 6:
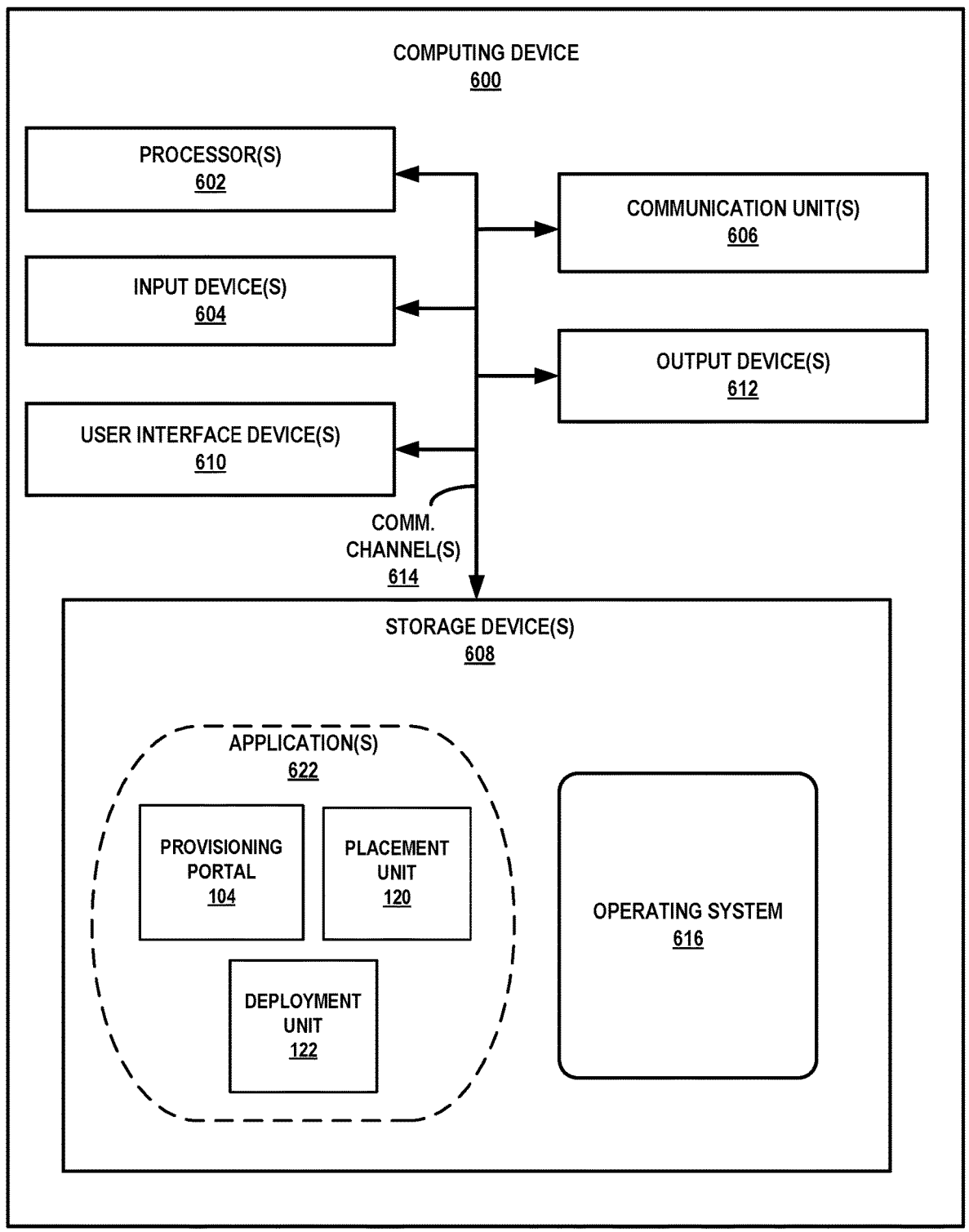
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing any one or more of provisioning portal 104, placement unit 120, deployment unit 122 or any other system, application, node software, or module described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). As shown in the specific example of FIG. 6, computing device 600 includes one or more processors 602, one or more input devices 604, one or more communication units 606, one or more output devices 612, one or more storage devices 608, and user interface (UI) device 610. Computing device 600, in one example, further includes one or more applications 622 and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, a message bus, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be processing circuitry capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622, access network intelligent controller 102 and/or access network agents 624 with processors 602, communication unit 606, storage device 608, input device 604, user interface devices 610, and output device 612.

Application 622 may also include program instructions and/or data that are executable by computing device 600. Example applications 622 executable by computing device 600 may include application and/or other software to implement capabilities described above. For example, applications 622 can include applications associated with provisioning portal 104, placement unit 120, and deployment unit 122.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A system comprising:
a network provisioning system comprising first processing circuitry; and
a provisioning portal comprising second processing circuitry,
wherein the provisioning portal is configured to:
receive, from a client device, an indication of selection of a service template specifying network service attributes with which a communication service is to be provisioned;
output, for display on a display device of the client device, a user interface comprising a tracking area map having a plurality of graphical objects, each graphical object representing a corresponding tracking area;
receive an indication of a selection of one or more graphical objects of the plurality of graphical objects corresponding to one or more tracking areas at which the communication service is to be provided; and
generate a service order based on the network service attributes with which the communication service is to be provisioned and the one or more tracking areas at which the communication service is to be provided,
wherein the network provisioning system is configured to provision, in network infrastructure, the communication service, in accordance with the service order, to provide the communication service at the one or more tracking areas.

2. The system of claim 1,
wherein the provisioning portal is further configured to receive an indication of a selection of one or more compute clouds within which the communication service is to be provisioned, and
wherein to generate the service order the provisioning portal is further configured to generate the service order based on the network service attributes, the one or more tracking areas, and the selected one or more compute clouds.

3. The system of claim 2,
wherein the provisioning portal is further configured to output, on the display device of the client device, a user interface comprising a compute cloud map having a plurality of graphical objects, each graphical object representing a corresponding compute cloud, and
wherein to receive the indication of the selection of the one or more compute clouds the provisioning portal is configured to receive an indication of the selection of the graphical objects corresponding to the one or more compute clouds.

4. The system of claim 2, wherein the one or more compute clouds comprise an edge compute cloud and a core compute cloud.

5. The system of claim 2, wherein the one or more compute clouds include one or more data centers.

6. The system of claim 2, wherein the network provisioning system is further configured to determine placement of a 5G core function in accordance with a match of a first tag associated with the 5G core function and a second tag associated with at least one of the one or more compute clouds.

7. The system of claim 1, wherein the service template specifies a network slice template specifying communications connectivity among a plurality of 5G core functions using a plurality of communications interfaces.

8. The system of claim 1,
wherein the provisioning portal is further configured to receive an indication of a selection of one or more subscribers to which the communication service is to be provided, and
wherein to generate the service order the provisioning portal is further configured to generate the service order based on the network service attributes, the one or more tracking areas, and the one or more subscribers.

9. The system of claim 1, wherein the provisioning portal is operated by a mobile network operator and the client device comprises a device operated by a tenant of the mobile network operator.

10. The system of claim 1, wherein the communication service is a network slice of a 5G mobile network.

11. A method comprising:
receiving, by processing circuitry and from a client device, an indication of a selection of a service template specifying network service attributes with which a communication service is to be provisioned;
outputting, on a display device of the client device, a user interface comprising a compute cloud map having a plurality of graphical objects, each graphical object representing a corresponding compute cloud of a plurality of compute clouds;
receiving an indication of a selection of one or more graphical objects of the plurality of graphical objects corresponding to one or more compute clouds of the plurality of compute clouds;
receiving, by the processing circuitry, an indication of a selection of one or more tracking areas at which the communication service is to be provided;
generating, by the processing circuitry, a service order based on the network service attributes with which the communication service is to be provisioned, the one or more tracking areas at which the communication service is to be provided, and the one or more compute clouds corresponding to the selected one or more graphical objects; and provisioning, in network infrastructure, the communication service in accordance with the service order, to provide the communication service at the one or more tracking areas.

12. The method of claim 11, further comprising outputting, for display on a display device of the client device, a user interface comprising a tracking area map having a plurality of graphical objects, each graphical object representing a corresponding tracking area,
wherein receiving the selection of the one or more tracking areas comprises receiving an indication of a selection of the graphical object corresponding to the tracking area of the one or more tracking areas.

13. The method of claim 11, wherein the processing circuitry is further configured to determine placement of a 5G core function in accordance with a match of a first tag associated with the 5G core function and a second tag associated with at least one of the one or more compute clouds.

14. The method of claim 11, further comprising receiving an indication of a selection of one or more subscribers to which the communication service is to be provided,
wherein generating the service order comprises generating the service order based on the network service attributes, the one or more tracking areas, the one or more compute clouds, and the one or more subscribers.

15. A system comprising:
a network provisioning system comprising first processing circuitry; and
a provisioning portal comprising second processing circuitry,
wherein the provisioning portal is configured to:
output, for display on a display device of a client device, a tracking area map having a plurality of first graphical objects, each first graphical object representing a corresponding tracking area;
output, for display on the display device, a compute cloud map having a plurality of second graphical objects, each second graphical object representing a corresponding compute cloud;
receive an indication of a selection of one or more first graphical objects of the plurality of first graphical objects, the one or more first graphical objects representing one or more corresponding tracking areas at which a communication service is to be provided;
receive an indication of a selection of one or more second graphical objects of the plurality of second graphical objects, the one or more second graphical objects representing one or more corresponding compute clouds within which the communication service is to be provisioned; and
generate a service order based on the one or more corresponding tracking areas corresponding to the selected one or more first graphical objects and the one or more compute clouds corresponding to the selected one or more second graphical objects,
wherein the network provisioning system is configured to provision, in network infrastructure, the communication service, in accordance with the service order, to provide the communication service at the one or more tracking areas.

16. The system of claim 15, wherein the one or more compute clouds comprise an edge compute cloud and a core compute cloud.

17. The system of claim 15, wherein the network provisioning system is further configured to determine placement of a plurality of 5G core functions in accordance with matches of first tags associated with the plurality of 5G core functions and second tags associated with the one or more compute clouds.

18. The system of claim 15, wherein the communication service is a network slice of a 5G mobile network.

* * * * *